(12) United States Patent
Abrosimov et al.

(10) Patent No.: US 10,040,464 B2
(45) Date of Patent: Aug. 7, 2018

(54) SYSTEM AND METHOD FOR PROVIDING LOCATION AND NAVIGATION SERVICES USING POSITIVE TRAIN CONTROL DATA

(71) Applicant: Westinghouse Air Brake Technologies Corporation, Wilmerding, PA (US)

(72) Inventors: Igor Abrosimov, N. Potomac, MD (US); Dennis M. Boyle, Frederick, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 68 days.

(21) Appl. No.: 15/331,050

(22) Filed: Oct. 21, 2016

(65) Prior Publication Data
US 2018/0111633 A1   Apr. 26, 2018

(51) Int. Cl.
*B61L 27/00* (2006.01)
*G01C 21/34* (2006.01)
*B61L 25/02* (2006.01)

(52) U.S. Cl.
CPC ......... *B61L 27/0077* (2013.01); *B61L 25/021* (2013.01); *B61L 25/025* (2013.01); *B61L 27/0011* (2013.01); *G01C 21/3492* (2013.01)

(58) Field of Classification Search
CPC ............. G01C 21/3492; B61L 27/0077; B61L 25/025; B61L 25/021; B61L 27/0011
See application file for complete search history.

(56) References Cited

U.S. PATENT DOCUMENTS

| | | |
|---|---|---|
| 5,867,122 A | 2/1999 | Zahm et al. |
| 7,650,207 B2 | 1/2010 | Metzger |
| 7,881,863 B2 | 2/2011 | Uyeki et al. |
| 7,966,126 B2 | 6/2011 | Willis et al. |
| 8,019,531 B2 | 9/2011 | Pinkus et al. |
| 8,082,071 B2 | 12/2011 | Daum et al. |
| 8,532,842 B2 | 9/2013 | Smith et al. |
| 8,583,373 B2 | 11/2013 | Hicks |
| 8,958,983 B2 | 2/2015 | Hilbrandie et al. |
| 8,990,007 B2 | 3/2015 | Shikimachi et al. |
| 8,996,306 B2 | 3/2015 | Kodan et al. |
| 9,014,976 B2 | 4/2015 | Ushida |
| 9,146,118 B2 | 9/2015 | Liu et al. |
| 2005/0205719 A1 | 9/2005 | Hendrickson et al. |
| 2009/0210154 A1* | 8/2009 | Willis ............... B61L 25/025 701/412 |
| 2013/0201316 A1* | 8/2013 | Binder ............... H04L 67/12 348/77 |
| 2014/0088865 A1 | 3/2014 | Thies et al. |

(Continued)

*Primary Examiner* — Richard M Camby
(74) *Attorney, Agent, or Firm* — The Webb Law Firm

(57) ABSTRACT

A method includes generating PTC data for at least a portion of a track network, the PTC data comprising real-time train data generated by an on-board system of a train traveling in the track network, the real-time train data comprising a train speed and a train location, generating predictive train location data based at least partially on the PTC data, the predictive train location data comprising at least one upcoming location of the train associated with at least one time; and transmitting at least a portion of the predictive train location data to at least one navigation service in response to receiving a request, the request comprising at least one of the following: a route, an intersection, a rail crossing, geographic coordinates, or any combination thereof.

20 Claims, 5 Drawing Sheets

(56) References Cited

U.S. PATENT DOCUMENTS

2016/0355199 A1* 12/2016 Kernwein ............... B61L 11/08
2016/0362131 A1* 12/2016 Hwa ..................... B62D 5/0457
2017/0106884 A1* 4/2017 Oswald ............... B61L 15/0063

* cited by examiner

SYSTEM AND METHOD FOR PROVIDING LOCATION AND NAVIGATION SERVICES USING POSITIVE TRAIN CONTROL DATA

BACKGROUND OF THE INVENTION

Field of the Invention

This invention relates generally to location and navigation services and, particularly, to a system and method for providing location and navigation services using positive train control data.

Description of the Related Art

Third-party navigation services collect and use data to enhance their navigation services. As an example, traffic data may be used by navigation services to route a driver of an automobile using GPS-based navigation around a congested area. However, because railroads utilize varying route schedules, speeds, and times, navigation services do not consider railroads or trains traveling on such railroads when providing directions to a driver.

As a result of the complications surrounding railroad routes and timing, navigation services are unable to predict traffic conditions or other road conditions associated with rail grade crossings or other like railroad structures. Thus, existing navigation technology, such as GPS-implemented turn-by-turn directions and rerouting services, is unable to accurately predict vehicle routes in consideration of railroad traffic.

Thus, there is a need to provide location and navigation services, including but not limited to predictive route services, using real-time train data and information that is usually internal to a railroad network.

SUMMARY OF THE INVENTION

Accordingly, and generally, provided is an improved system, method, and apparatus for providing predictive routing for road vehicles based on real-time train data.

According to one preferred and non-limiting embodiment or aspect, provided is a method for providing location and navigation services in a Positive Train Control (PTC) network, comprising: generating PTC data for at least a portion of a track network, the PTC data comprising real-time train data generated by an on-board system of a train traveling in the track network, the real-time train data comprising a train speed and a train location; generating predictive train location data based at least partially on the PTC data, the predictive train location data comprising at least one upcoming location of the train associated with at least one time; and transmitting at least a portion of the predictive train location data to at least one navigation service in response to receiving a request, the request comprising at least one of the following: a route, an intersection, a rail crossing, geographic coordinates, or any combination thereof.

In another preferred and non-limiting embodiment or aspect, the method may further comprise: generating a route for a road vehicle from a first location to a second location based at least partially on the predictive train location data.

In another preferred and non-limiting embodiment or aspect, generating the route for the road vehicle from the first location to the second location may comprise: determining at least one probable congestion of at least one road location having a rail crossing based on a predicted position of the train at a specified time; and determining a route that avoids the at least one road location at the specified time.

In another preferred and non-limiting embodiment or aspect, the method may further comprise: automatically formatting at least one of the predictive train location data and the PTC data for the at least one navigation service.

In another preferred and non-limiting embodiment or aspect, formatting the at least one of the predictive train location data and the PTC data for the at least one navigation service may comprise: generating an application programming interface configured to allow the at least one third-party navigation service to selectively access or query the at least one of the predictive train location data and the PTC data based on at least one of a location and a time.

In another preferred and non-limiting embodiment or aspect, the PTC data may further comprise a train length, and the predictive train location data may be generated based at least partially on the train length, the train speed, and the train location.

In another preferred and non-limiting embodiment or aspect, the predictive train location data may be generated based at least partially on historical PTC data.

In another preferred and non-limiting embodiment or aspect, the PTC data may comprise at least one of the following: movement authority data for the track network, wayside device data from at least one wayside device in the track network, rail crossing data from at least one rail crossing in the track network, or any combination thereof.

In another preferred and non-limiting embodiment or aspect, generating the PTC data may comprise collecting, by a PTC server, real-time train data from the train and other PTC data from at least one of the following: another train in the track network, central dispatch, a movement authority, a switch, a wayside device, or any combination thereof.

According to another preferred and non-limiting embodiment or aspect, a system for providing location and navigation services in a Positive Train Control (PTC) network, may comprise: a back office system comprising a remote server, the remote server programmed or configured to (i) generate PTC data for at least a portion of the track network, the PTC data comprising real-time train data generated by an on-board system of a train traveling in the track network, the real-time train data comprising a train speed and a train location; (ii) generate predictive train location data based at least partially on the PTC data, the predictive train location data comprising at least one upcoming location of the train associated with at least one time; and (iii) transmit at least a portion of the predictive train location data to at least one navigation service in response to receiving a request, the request comprising at least one of the following: a route, an intersection, a rail crossing, geographic coordinates, or any combination thereof.

In another preferred and non-limiting embodiment or aspect, the system may further comprise the on-board system of the train, the on-board system arranged in at least one locomotive of the train and comprising at least one processor that may be programmed or configured to: (i) generate the real-time train data while the train is traveling in the track network; and (ii) transmit the real-time train data to the remote server.

In another preferred and non-limiting embodiment or aspect, the remote server may be further programmed or configured to automatically format at least one of the predictive train location data and the PTC data for the at least one navigation service.

In another preferred and non-limiting embodiment or aspect, the remote server may format the at least one of the predictive train location data and the PTC data for the at least one navigation service by generating an application programming interface configured to allow the at least one third-party navigation service to selectively access or query the at least one of the predictive train location data and the PTC data based on at least one of a location and a time.

In another preferred and non-limiting embodiment or aspect, the PTC data may further comprise a train length, and the predictive train location data may be generated based at least partially on the train length, the train speed, and the train location.

In another preferred and non-limiting embodiment or aspect, the predictive train location data may be generated based at least partially on historical PTC data.

In another preferred and non-limiting embodiment or aspect, the PTC data may comprise at least one of the following: movement authority data for the track network, wayside device data from at least one wayside device in the track network, rail crossing data from at least one rail crossing in the track network, or any combination thereof.

In another preferred and non-limiting embodiment or aspect, generating the PTC data may comprise: collecting, by a PTC server, real-time train data from the train and other PTC data from at least one of the following: another train in the track network, central dispatch, a movement authority, a switch, a wayside device, or any combination thereof.

According to a further preferred and non-limiting embodiment or aspect, a computer program product for providing location and navigation services in a Positive Train Control (PTC) network, may comprise at least one non-transitory computer-readable medium comprising program instructions that, when executed by at least one processor of at least one remote server, causes the at least one remote server to: generate PTC data for at least a portion of a track network, the PTC data comprising real-time train data generated by an on-board system of a train traveling in the track network, the real-time train data comprising a train speed and a train location; generate predictive train location data based at least partially on the PTC data, the predictive train location data comprising at least one upcoming location of the train associated with at least one time; and transmit at least a portion of the predictive train location data to at least one navigation service in response to receiving a request, the request comprising at least one of the following: a route, an intersection, a rail crossing, geographic coordinates, or any combination thereof.

In another preferred and non-limiting embodiment or aspect, the program instructions, when executed by the at least one processor, may further cause the at least one remote server to automatically format at least one of the predictive train location data and the PTC data for the at least one navigation service by generating an application programming interface configured to allow the at least one navigation service to selectively access or query the at least one of the predictive train location data and the PTC data based on at least one of a location and a time.

In another preferred and non-limiting embodiment or aspect, the PTC data may further comprise a train length, and wherein the predictive train location data may be generated based at least partially on the train length, the train speed, and the train location.

Further preferred and non-limiting embodiments or aspects will now be described in the following numbered clauses.

Clause 1: A method for providing location and navigation services in a Positive Train Control (PTC) network, comprising: generating PTC data for at least a portion of a track network, the PTC data comprising real-time train data generated by an on-board system of a train traveling in the track network, the real-time train data comprising a train speed and a train location; generating predictive train location data based at least partially on the PTC data, the predictive train location data comprising at least one upcoming location of the train associated with at least one time; and transmitting at least a portion of the predictive train location data to at least one navigation service in response to receiving a request, the request comprising at least one of the following: a route, an intersection, a rail crossing, geographic coordinates, or any combination thereof.

Clause 2: The method of clause 1, further comprising generating a route for a road vehicle from a first location to a second location based at least partially on the predictive train location data.

Clause 3: The method of clause 1 or 2, wherein generating the route for the road vehicle from the first location to the second location comprises: determining at least one probable congestion of at least one road location having a rail crossing based on a predicted position of the train at a specified time; and determining a route that avoids the at least one road location at the specified time.

Clause 4: The method of any of clauses 1-3, further comprising automatically formatting at least one of the predictive train location data and the PTC data for the at least one navigation service.

Clause 5: The method of any of clauses 1-4; wherein formatting the at least one of the predictive train location data and the PTC data for the at least one navigation service comprises generating an application programming interface configured to allow the at least one third-party navigation service to selectively access or query the at least one of the predictive train location data and the PTC data based on at least one of a location and a time.

Clause 6: The method of any of clauses 1-5, wherein the PTC data further comprises a train length, and wherein the predictive train location data is generated based at least partially on the train length, the train speed, and the train location.

Clause 7: The method of any of clauses 1-6, wherein the predictive train location data is generated based at least partially on historical PTC data.

Clause 8: The method of any of clauses 1-7, wherein the PTC data comprises at least one of the following: movement authority data for the track network, wayside device data from at least one wayside device in the track network, rail crossing data from at least one rail crossing in the track network, or any combination thereof.

Clause 9: The method of any of clauses 1-8, wherein generating the PTC data comprises collecting, by a PTC server, real-time train data from the train and other PTC data from at least one of the following: another train in the track network, central dispatch, a movement authority, a switch, a wayside device, or any combination thereof.

Clause 10: A system for providing location and navigation services in a Positive Train Control (PTC) network, comprising: a back office system comprising a remote server, the remote server programmed or configured to: (i) generate PTC data for at least a portion of the track network, the PTC data comprising real-time train data generated by an on-board system of a train traveling in the track network, the real-time train data comprising a train speed and a train location; (ii) generate predictive train location data based at least partially on the PTC data, the predictive train location data comprising at least one upcoming location of the train associated with at least one time; and (iii) transmit at least a portion of the predictive train location data to at least one navigation service in response to receiving a request, the request comprising at least one of the following: a route, an intersection, a rail crossing, geographic coordinates, or any combination thereof.

Clause 11: The system of clause 10, further comprising: the on-board system of the train, the on-board system arranged in at least one locomotive of the train and comprising at least one processor programmed or configured to: (i) generate the real-time train data while the train is traveling in the track network; and (ii) transmit the real-time train data to the remote server.

Clause 12: The system of clause 10 or 11, wherein the remote server is further programmed or configured to automatically format at least one of the predictive train location data and the PTC data for the at least one navigation service.

Clause 13: The system of any of clauses 10-12, wherein the remote server formats the at least one of the predictive train location data and the PTC data for the at least one navigation service by generating an application programming interface configured to allow the at least one third-party navigation service to selectively access or query the at least one of the predictive train location data and the PTC data based on at least one of a location and a time.

Clause 14: The system of any of clauses 10-13, wherein the PTC data further comprises a train length, and wherein the predictive train location data is generated based at least partially on the train length, the train speed, and the train location.

Clause 15: The system of any of clauses 10-14, wherein the predictive train location data is generated based at least partially on historical PTC data.

Clause 16: The system of any of clauses 10-15, wherein the PTC data comprises at least one of the following: movement authority data for the track network, wayside device data from at least one wayside device in the track network, rail crossing data from at least one rail crossing in the track network, or any combination thereof.

Clause 17: The system of any of clauses 10-16, wherein the remote server generates the PTC data comprises collecting, by a PTC server, real-time train data from the train and other PTC data from at least one of the following: another train in the track network, central dispatch, a movement authority, a switch, a wayside device, or any combination thereof.

Clause 18: A computer program product for providing location and navigation services in a Positive Train Control (PTC) network, comprising at least one non-transitory computer-readable medium comprising program instructions that, when executed by at least one processor of at least one remote server, causes the at least one remote server to: generate PTC data for at least a portion of a track network, the PTC data comprising real-time train data generated by an on-board system of a train traveling in the track network, the real-time train data comprising a train speed and a train location; generate predictive train location data based at least partially on the PTC data, the predictive train location data comprising at least one upcoming location of the train associated with at least one time; and transmit at least a portion of the predictive train location data to at least one navigation service in response to receiving a request, the request comprising at least one of the following: a route, an intersection, a rail crossing, geographic coordinates, or any combination thereof.

Clause 19: The computer program product of clause 18, wherein the program instructions, when executed by the at least one processor, further cause the at least one remote server to automatically format at least one of the predictive train location data and the PTC data for the at least one navigation service by generating an application programming interface configured to allow the at least one navigation service to selectively access or query the at least one of the predictive train location data and the PTC data based on at least one of a location and a time.

Clause 20: The computer program product of clause 18 or 19, wherein the PTC data further comprises a train length, and wherein the predictive train location data is generated based at least partially on the train length, the train speed, and the train location.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which.

DETAILED DESCRIPTION

Figure 1:
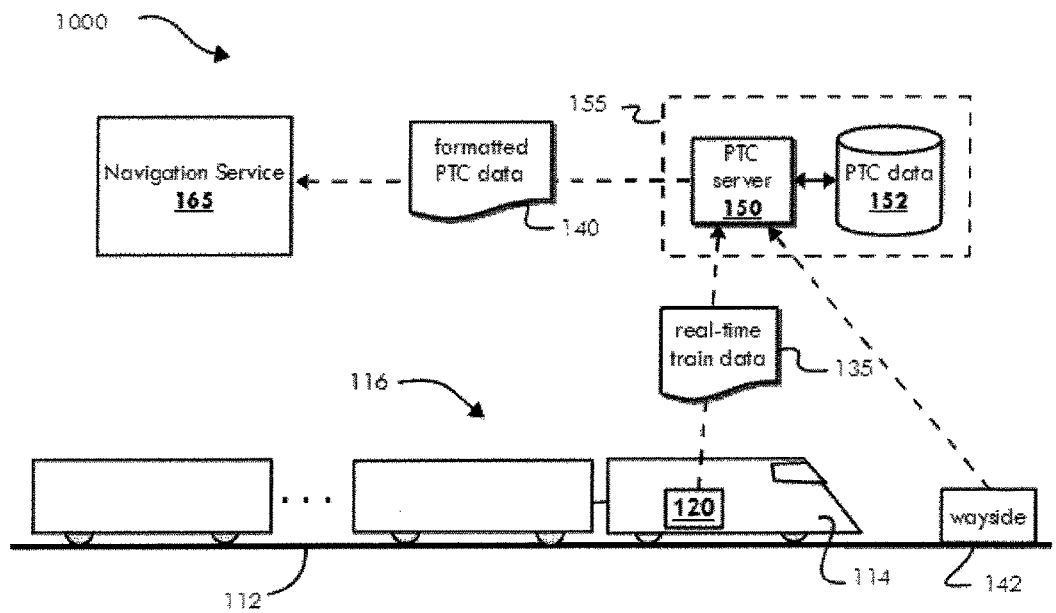
FIG. 1 illustrates a schematic diagram of one embodiment or aspect of a system for providing location and navigation services in a Positive Train Control (PTC) network according to the principles of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary configurations of the invention. Hence, specific dimensions and other physical characteristics related to the configurations disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like.

According to one preferred and non-limiting embodiment or aspect of the present invention, provided is a system and method for providing location and navigation services for road vehicles, such as but not limited to predictive routing services, in a Positive Train Control (PTC) network based on real-time train data. By leveraging the data available through a network of trains operating within PTC systems, preferred and non-limiting embodiments or aspects of present invention are able to predict intersections of train traffic and road traffic to generate routes for automobiles and other non-rail vehicles. Preferred and non-limiting embodiments or aspects of the present invention may generate and collect PTC data from a train network, automatically format the PTC data for one or more navigation systems, and make the formatted PTC data available over a network. Further, preferred and non-limiting embodiments or aspects of the present invention may involve generating predictive train location data based on the PTC data, such that the time of arrival of a train at a particular intersection is known in advance of the train arriving. Predictive train data may include one or more locations associated with one or more times, and may be generated based on train data such as, for example, a current speed of one or more trains, a planned or predicted speed of one or more trains, a length of one or more trains, changes in movement authority throughout the track network, data and/or status information relating to railroad switches and planned routes of trains in the track network, and/or any other type of available real-time train data.

Referring to FIG. 1, a system 1000 for providing location and navigation services for road vehicles, such as but not limited to predictive routing services, in a PTC network is shown according to a preferred and non-limiting embodiment or aspect. The train 116 is traveling on a track 112 in a rail network with other trains (not shown). The train 116 includes an on-board system 120 arranged in at least one locomotive 114. The on-board system 120 may include at least one processor that is programmed or configured to generate real-time train data 135 from the train 116 and other railway data from wayside devices 142, central dispatch (not shown), and/or other PTC components of the rail network. The real-time train data 135 may include, for example, a train speed, a train location, a train length, train directional information, train brake data, historical train data, train route data, and/or the like. The real-time train data 135 is transmitted by the on-board system 120, an end-of-train device (not shown), or any other device located on board the train, to a back office system 155 which may include a PTC server 150. It will be appreciated that the on-board system 120 may also communicate the real-time train data 135 to a separate central dispatch system or, in other preferred and non-limiting embodiments or aspects, the central dispatch system may be part of the back office system 155. Various other arrangements are possible.

With continued reference to FIG. 1, the real-time train data 135 may be communicated to the PTC server 150, via, for example, a radio/cellular network. It will be appreciated that various methods of communication may be used including, but not limited to, satellite communications, indirect communications via connected wayside equipment, and/or the like. Wayside devices 142 located throughout the track network may also communicate railway data to the PTC server 150 including, for example, switch data, data received from passing trains, movement authority data, and/or the like. The PTC server 150 generates PTC data 152 from this information and stores it in one or more data storage devices located at the back office system 155 or elsewhere. Generating PTC data 152 may include, for example, aggregating, receiving, and/or collecting various types of data from one or more sources throughout a PTC network and arranging it in one or more data structures. It will be appreciated that the PTC data may be generated in any number of forms such as, for example, one or more tables, arrays, databases, and/or the like.

Still referring to FIG. 1, one or more processors at the back office system 155, such as but not limited to the PTC server 150, may automatically format the PTC data 152 to produce formatted PTC data 140 that is made available to one or more navigation services 165. The navigation services 165 may include, for example, Google Maps, Bing Maps, Garmin, and/or other like third-party navigation services, or may alternatively be a navigation service operated from the back office system 155. Formatting the PTC data 152 may include generating an application programming interface (API). The API may be configured to allow the navigation service to selectively access or query the PTC data based on a location, a time, an intersection, a region, and/or another specified parameter.

In another preferred and non-limiting embodiment or aspect, the PTC data may be formatted in a structured data format for the navigation service such as, for example, JavaScript Object Notation (JSON), Extensible Markup Language (XML), comma-separated values (CSV), and/or any other like structured data formats. In preferred and non-limiting embodiments or aspects, the PTC data 140 may be made selectively available to the navigation services 165 in response to specific queries based on geographic coordinates, intersections, specific crossings, and/or the like. In one preferred and non-limiting embodiment or aspect, the PTC data 140 or a portion thereof may be transmitted to navigation services 165 or data storage devices associated therewith intermittently or as it becomes available.

Figure 2:
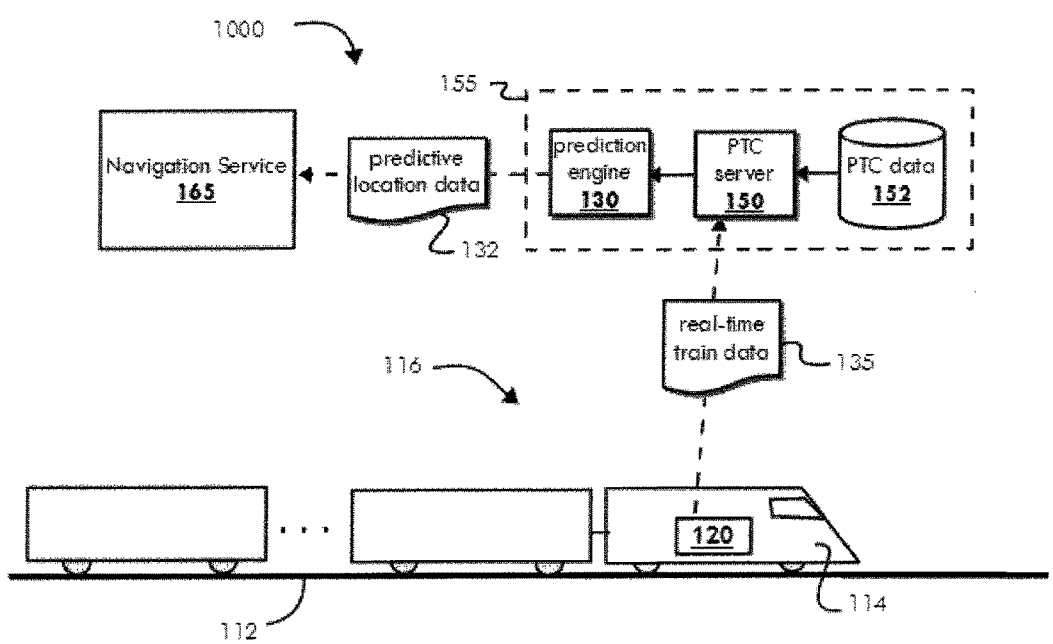
FIG. 2 illustrates another schematic diagram of another embodiment or aspect of a system for providing location and navigation services in a PTC network according to the principles of the present invention.

Referring now to FIG. 2, a system 1000 for providing location and navigation services for road vehicles, such as but not limited to predictive routing services, in a PTC network is shown according to another preferred and non-limiting embodiment or aspect. In this embodiment or aspect, the back office system includes a PTC server 150, PTC data 152 stored on a data storage device, and a prediction engine 130. The prediction engine 130 may include one or more processors executing one or more software applications or, in preferred and non-limiting embodiments or aspects, a software application executing on the PTC server 150, another remote server at or remote to the back office system, and/or the on-board computer 120 of the train 116. The prediction engine 130 is programmed or configured to process the PTC data 152 according to one or more algorithms to generate predictive location data 132. For example, the prediction engine 130 may predict times where railway crossings are unpassable due to train traffic based on a current location of a train, the speed of that train, a planned speed of that train (e.g., due to speed bulletins or other restrictions on upcoming sections of track), the length of the train, and/or the like. In this manner, the prediction engine 130 is able to determine, for a given rail crossing, when a train will be passing through that crossing (e.g., based at least on the train location and speed) and for how long (e.g., based at least on the train speed and length). This predictive location data 132 may be formatted in numerous ways, such as by rail crossing, by train, by road, by intersection, by region, and/or the like.

With continued reference to FIG. 2, the predictive location data 132 is provided to one or more navigation services 165 upon request, automatically at specified intervals, as it becomes available, and/or by any other method. In one preferred and non-limiting embodiment or aspect, the predictive location data 132 is made available to the navigation services 165 through an API. The predictive location data 132 may be in one or more data structures, arranged in any number of ways. For example, the predictive location data 132 may be arranged by geographic coordinates, intersections, specific crossings, and/or the like, such that a navigation service 165 can request the predictive location data 132 by specifying particular coordinates, an intersection, and/or a specific crossing, in response to which the navigation service 165 may be provided with an estimated time until a train arrives at that location, an estimated time that the crossing will be closed, the time ranges during which the crossing will be closed, and/or other like predictive location data 132.

Figure 3:
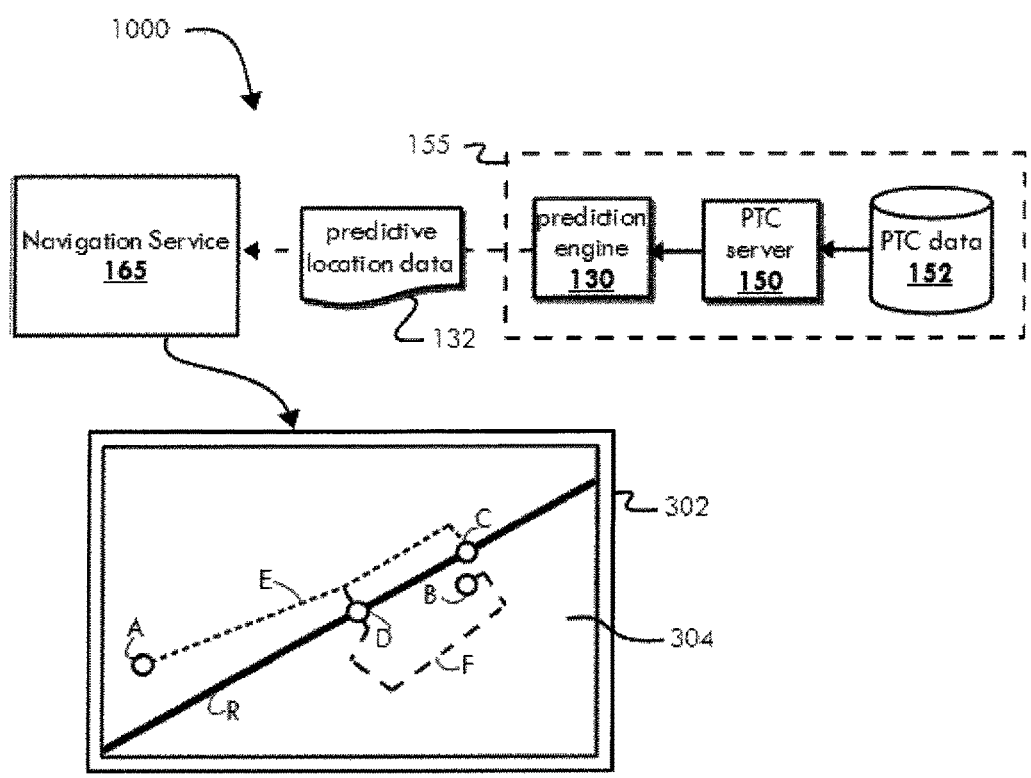
FIG. 3 illustrates a further schematic diagram of a system for providing location and navigation services in a PTC network according to the principles of the present invention.

Referring now to FIG. 3, a system 1000 for providing location and navigation services for road vehicles, such as but not limited to predictive routing services, in a PTC network is shown according to another preferred and non-limiting embodiment or aspect. A navigation device 302, such as a handheld GPS navigation device, an in-dash GPS navigation device, a smartphone with location services (e.g., GPS or otherwise), a tablet computer with location services, a laptop, and/or the like, is in communication with a navigation service 165. The navigation device 302 displays a map interface 304 which shows navigation directions for a road vehicle. In another preferred and non-limiting embodiment, a road vehicle can be an unmanned and/or a self-guided vehicle that is capable of interacting with the control modules of the road vehicle directly to choose a route, and not with a user. It will be appreciated that the navigation device 302 may display any type of graphical user interface (GUI) for providing navigation directions, such as a list of turn-by-turn directions. The navigation device 304 may also provide audible navigation directions to a user.

With continued reference to FIG. 3, the map interface 304 illustrates a region including a railroad track R, a current location of a road vehicle A, a destination B for the road vehicle, a railroad crossing C, and a tunnel D that passes under the railroad track R. In this example, the road vehicle A is navigating toward destination B along a first navigational route E. The PTC data 152 associated with a train traveling on the railroad track R is obtained from an on-board system of that train (not shown in FIG. 3) and processed with the prediction engine 130. The prediction engine 130 generates predictive location data 132 indicating that the train will be traveling on the railroad track R such that the railroad crossing C will be closed by the time that the road vehicle A approaches it along the first navigation route E. Using this predictive location data 132, the navigation service 165 may reroute the road vehicle A along a second navigation route F that avoids the railroad track R by passing under it through a tunnel D. In this manner, the road vehicle A can reach the destination B without waiting at the railroad crossing C. In another preferred and non-limiting embodiment or aspect, the user can receive an alert that from the navigation device 302 that the route is being updated with an estimated time of arrival for both routes.

Still referring to FIG. 3, in one preferred and non-limiting embodiment or aspect, the user of the navigation device 302 (in this example, the driver of the road vehicle A) may be prompted with a choice of either the first navigation route E or the second navigation route F. Moreover, if information about the road vehicle A is known, such road vehicle information may be used to choose or suggest a navigation route. For example, if the road vehicle A is a truck, the navigation service 165 may determine that the tunnel D is unpassable. Thus, the road vehicle A may not be presented with the second navigation route F. If another navigation route is available, such as one that crosses the railroad track R earlier before the train arrives or uses an overpass to cross the railroad track R, that alternative navigation route may be chosen or suggested to the user. In another preferred and non-limiting embodiment or aspect, if a train uses an overpass to cross the railroad track R, the PTC data 152 will update and the navigation device 302 will send an alert to the user that the first navigation route E is now available.

Figure 4:
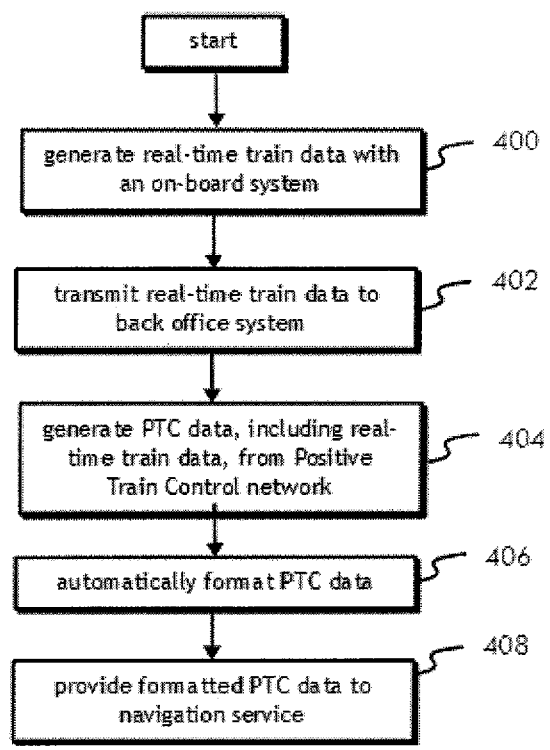
FIG. 4 is a flow diagram for one embodiment or aspect of a method for providing location and navigation services in a PTC network according to the principles of the present invention.

Referring now to FIG. 4, a method for providing location and navigation services for road vehicles, such as but not limited to predictive routing services, in a PTC network is shown according to a preferred and non-limiting embodiment or aspect. At a first step 400, real-time train data is generated by an on-board system. This real-time train data may include, for example, train speed data, train location data, train length data, and/or the like. At step 402, the real-time train data is communicated to a back office system which may include a PTC server. At step 404, the PTC server generates PTC data by aggregating data from throughout the PTC network, including real-time train data from multiple trains, wayside device data, rail crossing data, movement authority data, and/or any other type of train and/or railway data available in the PTC network. At step 406, the PTC data is automatically formatted for at least one navigation service. At step 408, the formatted PTC data is provided to one or more navigation services in response to a request or automatically without receiving a request (e.g., as it becomes available or at intervals).

Figure 5:
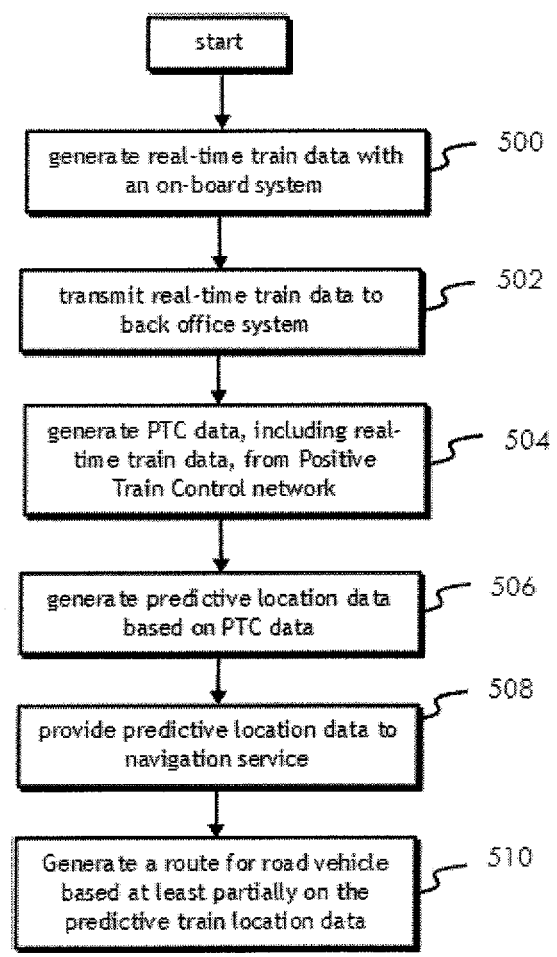
FIG. 5 is a flow diagram for another embodiment or aspect of a method according to the principles of the present invention.

Referring now to FIG. 5, a method for providing location and navigation services for road vehicles, such as but not limited to predictive routing services, in a PTC network is shown according to another preferred and non-limiting embodiment or aspect. At a first step 500, real-time train data is generated by an on-board system. This real-time train data may include, for example, train speed data, train location data, train length data, and/or the like. At step 502, the real-time train data is communicated to a back office system which may include a PTC server. At step 504, the PTC server generates PTC by aggregating data from throughout the PTC network, including train data from multiple trains, wayside device data, rail crossing data, movement authority data, and/or any other type of train and/or railway data available in the PTC network. At step 506, predictive location data is generated based on the PTC data. At step 508, the predictive location data is provided to one or more navigation services in response to a request or automatically without receiving a request (e.g., as it becomes available or at intervals). In preferred and non-limiting embodiments, the predictive location data is provided in response to a query specifying a location, region, switch, intersection, and/or the like. At step 510, a route for a road vehicle may be generated based at least partially on the predictive location data. It will be appreciated that the route may be generated by a third-party navigation service and, in another preferred and non-limiting embodiment or aspect, by the back office system and/or PTC server.

Figure 6:
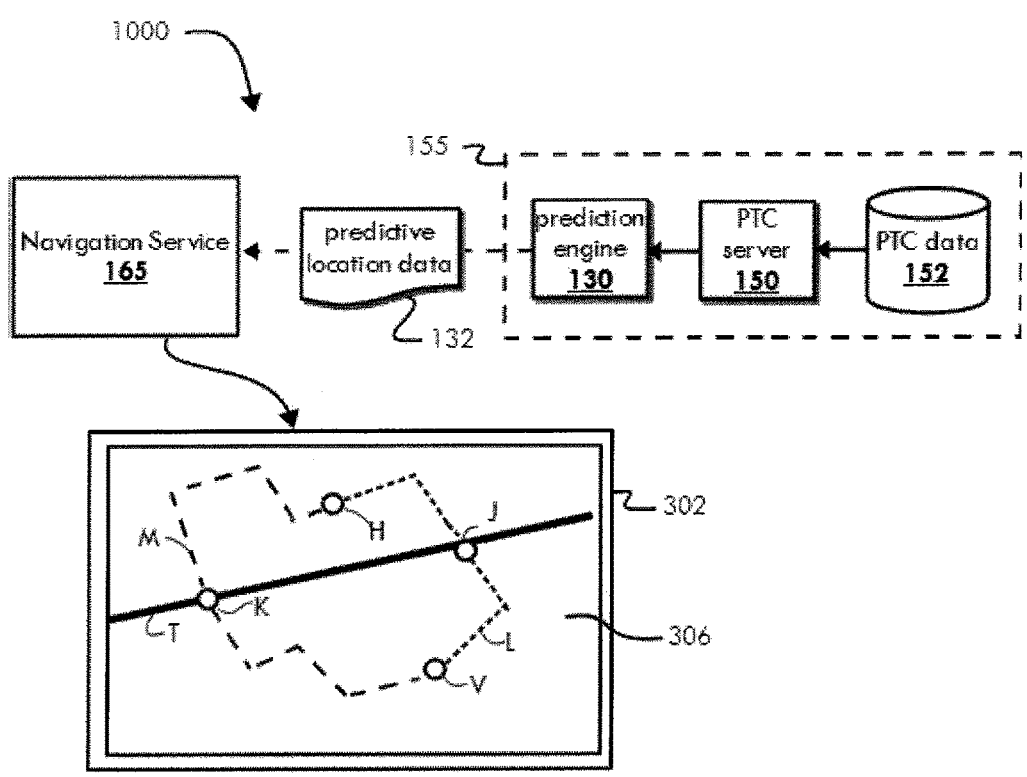
FIG. 6 illustrates a schematic diagram of one embodiment or aspect of a system for providing location and navigation services in a Positive Train Control (PTC) network according to the principles of the present invention.

Referring now to FIG. 6, a system 1000 for providing location and navigation services for road vehicles, such as but not limited to predictive routing services, in a PTC network is shown according to another preferred and non-limiting embodiment or aspect. A navigation device 302, such as a handheld GPS navigation device, an in-dash GPS navigation device, a smartphone with location services (e.g., GPS or otherwise), a tablet computer with location services, a laptop, and/or the like, is in communication with a navigation service 165. The navigation device 302 displays a map interface 306, which shows navigation directions for a road vehicle. In another preferred and non-limiting embodiment, a road vehicle can be an unmanned and/or a self-guided vehicle that is capable of interacting with the control modules of the road vehicle directly to choose a route, and not with a user. It will be appreciated that the navigation device 302 may display any type of graphical user interface (GUI) for providing navigation directions, such as a list of turn-by-turn directions. The navigation device 306 may also provide audible navigation directions to a user.

With continued reference to FIG. 6, the map interface 306 illustrates a region including a railroad track T, a current location of a road vehicle V, a destination H for the road vehicle V, a bridge K that goes over railroad track T, and a railroad crossing J. In this example, the road vehicle V is navigating toward destination H along a first navigational route L. The PTC data 152 associated with a train traveling on the railroad track T is obtained from an on-board system of that train (not shown in FIG. 6) and processed with the prediction engine 130. The prediction engine 130 generates predictive location data 132 indicating that the train will be traveling on the railroad track T, such that the railroad crossing J will be closed by the time that the road vehicle V approaches it along the first navigation route L. Using this predictive location data 132, the navigation service 165 may reroute the road vehicle V along a second navigation route M that avoids the travels above railroad track T through the use of bridge K. In this manner, the road vehicle V can reach the destination H without waiting at the railroad crossing J. In another preferred and non-limiting embodiment, the user can receive an alert that from the navigation device 302 that the route is being updated with an estimated time of arrival for both routes.

Still referring to FIG. 6, in one preferred and non-limiting embodiment or aspect, the user of the navigation device 302 (in this example, the driver of the road vehicle V) may be prompted with a choice of either the first navigation route L or the second navigation route M. If another navigation route is available, such as one that crosses the railroad track T earlier before the train arrives or uses an overpass to cross the railroad track T, that alternative navigation route may be chosen or suggested to the user. In another preferred and non-limiting embodiment or aspect, if a train uses an overpass to cross the railroad track T, the PTC data 152 will update and the navigation device 302 will send an alert to the user that the first navigation route E is now available.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment or aspect.

The invention claimed is:

1. A method for providing location and navigation services in a Positive Train Control (PTC) network, comprising:
   generating PTC data for at least a portion of a track network, the PTC data comprising real-time train data generated by an on-board system of a train traveling in the track network, the real-time train data comprising a train speed and a train location;
   generating predictive train location data based at least partially on the PTC data, the predictive train location data comprising at least one upcoming location of the train associated with at least one time; and
   transmitting at least a portion of the predictive train location data to at least one navigation service in response to receiving a request, the request comprising at least one of the following: an intersection, a rail crossing, geographic coordinates, or any combination thereof.

2. The method of claim 1, further comprising generating a route for a road vehicle from a first location to a second location based at least partially on the predictive train location data.

3. The method of claim 2, wherein generating the route for the road vehicle from the first location to the second location comprises:
   determining at least one probable congestion of at least one road location having a rail crossing based on a predicted position of the train at a specified time; and
   determining the route such that the route avoids the at least one road location at the specified time.

4. The method of claim 1, further comprising automatically formatting at least one of the predictive train location data and the PTC data for the at least one navigation service.

5. The method of claim 4, wherein formatting the at least one of the predictive train location data and the PTC data for the at least one navigation service comprises generating an application programming interface configured to allow the at least one navigation service to selectively access or query the at least one of the predictive train location data and the PTC data based on at least one of a location and a time.

6. The method of claim 1, wherein the PTC data further comprises a train length, and wherein the predictive train location data is generated based at least partially on the train length, the train speed, and the train location.

7. The method of claim 1, wherein the predictive train location data is generated based at least partially on historical PTC data.

8. The method of claim 1, wherein the PTC data comprises at least one of the following: movement authority data for the track network, wayside device data from at least one wayside device in the track network, rail crossing data from at least one rail crossing in the track network, or any combination thereof.

9. The method of claim 1, wherein generating the PTC data comprises collecting, by a PTC server, real-time train data from the train and other PTC data from at least one of the following: another train in the track network, central dispatch, a movement authority, a switch, a wayside device, or any combination thereof.

10. A system for providing location and navigation services in a Positive Train Control (PTC) network, comprising:
 a back office system comprising a remote server, the remote server programmed or configured to:
  (i) generate PTC data for at least a portion of the track network, the PTC data comprising real-time train data generated by an on-board system of a train traveling in the track network, the real-time train data comprising a train speed and a train location;
  (ii) generate predictive train location data based at least partially on the PTC data, the predictive train location data comprising at least one upcoming location of the train associated with at least one time; and
  (iii) transmit at least a portion of the predictive train location data to at least one navigation service in response to receiving a request, the request comprising at least one of the following: an intersection, a rail crossing, geographic coordinates, or any combination thereof.

11. The system of claim 10, further comprising:
 the on-board system of the train, the on-board system arranged in at least one locomotive of the train and comprising at least one processor programmed or configured to:
  (i) generate the real-time train data while the train is traveling in the track network; and
  (ii) transmit the real-time train data to the remote server.

12. The system of claim 10, wherein the remote server is further programmed or configured to automatically format at least one of the predictive train location data and the PTC data for the at least one navigation service.

13. The system of claim 12, wherein the remote server formats the at least one of the predictive train location data and the PTC data for the at least one navigation service by generating an application programming interface configured to allow the at least one third-party navigation service to selectively access or query the at least one of the predictive train location data and the PTC data based on at least one of a location and a time.

14. The system of claim 10, wherein the PTC data further comprises a train length, and wherein the predictive train location data is generated based at least partially on the train length, the train speed, and the train location.

15. The system of claim 10, wherein the predictive train location data is generated based at least partially on historical PTC data.

16. The system of claim 10, wherein the PTC data comprises at least one of the following: movement authority data for the track network, wayside device data from at least one wayside device in the track network, rail crossing data from at least one rail crossing in the track network, or any combination thereof.

17. The system of claim 10, wherein the remote server generates the PTC data comprises collecting, by a PTC server, real-time train data from the train and other PTC data from at least one of the following: another train in the track network, central dispatch, a movement authority, a switch, a wayside device, or any combination thereof.

18. A computer program product for providing location and navigation services in a Positive Train Control (PTC) network, comprising at least one non-transitory computer-readable medium comprising program instructions that, when executed by at least one processor of at least one remote server, causes the at least one remote server to:
 generate PTC data for at least a portion of a track network, the PTC data comprising real-time train data generated by an on-board system of a train traveling in the track network, the real-time train data comprising a train speed and a train location;
 generate predictive train location data based at least partially on the PTC data, the predictive train location data comprising at least one upcoming location of the train associated with at least one time; and
 transmit at least a portion of the predictive train location data to at least one navigation service in response to receiving a request, the request comprising at least one of the following: an intersection, a rail crossing, geographic coordinates, or any combination thereof.

19. The computer program product of claim 18, wherein the program instructions, when executed by the at least one processor, further cause the at least one remote server to automatically format at least one of the predictive train location data and the PTC data for the at least one navigation service by generating an application programming interface configured to allow the at least one navigation service to selectively access or query the at least one of the predictive train location data and the PTC data based on at least one of a location and a time.

20. The computer program product of claim 18, wherein the PTC data further comprises a train length, and wherein the predictive train location data is generated based at least partially on the train length, the train speed, and the train location.

\* \* \* \* \*